United States Patent

Bongers et al.

[11] Patent Number: 5,853,111
[45] Date of Patent: Dec. 29, 1998

[54] TWO-COMPARTMENT DISPENSER WITH AN INTEGRATED SEALING DOSE REGULATOR AND A PROCESS FOR DISPENSING LIQUIDS

[75] Inventors: Bernhard Bongers, Duesseldorf; Andreas Flohr, Kaarst; Stefan Meurer, Neuss; Volker Weiss, Langenfeld, all of Germany

[73] Assignee: Henkel Kommanditgesellschaft auf Aktien, Duesseldorf, Germany

[21] Appl. No.: 718,559

[22] PCT Filed: Mar. 21, 1995

[86] PCT No.: PCT/EP95/01041

§ 371 Date: Oct. 30, 1996

§ 102(e) Date: Oct. 30, 1996

[87] PCT Pub. No.: WO95/27187

PCT Pub. Date: Oct. 12, 1995

[30] Foreign Application Priority Data

Mar. 30, 1994 [DE] Germany ............ 44 11 021.9

[51] Int. Cl.⁶ ............ B65D 37/00; G01F 11/26; G01F 11/28
[52] U.S. Cl. ............ 222/212; 222/207; 222/439; 222/455
[58] Field of Search ............ 222/212, 439, 222/207, 455

[56] References Cited

U.S. PATENT DOCUMENTS

| | | | |
|---|---|---|---|
| 2,387,374 | 10/1945 | Watters | 222/455 |
| 2,943,767 | 7/1960 | Moro-Lin | 222/207 |
| 4,147,306 | 4/1979 | Bennett | 222/212 |
| 4,264,022 | 4/1981 | Perne et al. | 222/547 |
| 4,589,465 | 5/1986 | Gerding et al. | 165/66.1 |
| 4,625,897 | 12/1986 | Wortley | 222/205 |
| 4,723,690 | 2/1988 | Vom Hofe | 221/96 |
| 4,728,011 | 3/1988 | Schuster et al. | 222/439 |
| 5,000,353 | 3/1991 | Kostanecki et al. | 222/210 |

FOREIGN PATENT DOCUMENTS

| | | |
|---|---|---|
| 0175256 | 3/1986 | European Pat. Off. . |
| 402258 | 10/1909 | France . |
| 1133650 | 6/1956 | Germany . |
| 7810073 | 7/1978 | Germany . |
| 3301898 | 7/1984 | Germany . |
| 3522807 | 1/1986 | Germany . |

*Primary Examiner*—Andres Kashnikow
*Assistant Examiner*—Keats Quinalty
*Attorney, Agent, or Firm*—Ernest G. Szoke; Wayne C. Jaeschke; Kenneth Watov

[57] ABSTRACT

The invention is a tubular two-chamber liquid metering device for leaktight insertion into a container opening. The metering device consists of a cylindrical wall with a closed base and a cover which is provided with a passage for a pouring duct. The wall has at least one opening in the region of the cover and at least one further opening is located on a peripheral line between the opening and the base. Disposed in the outer cylindrical chamber defined by the wall, the base and the cover is a tubular body which at one end is connected in a leaktight manner to the pouring duct and at its other end maintains a distance from the base. The tubular body has at least one opening on a peripheral line in the region of the connection to the pouring duct. A freely movable body with a circular cross-section is provided in the main metering chamber defined by the inner cylinder between the opening and the base. The invention further provides a method of metering liquids via a chamber device in which a free body is provided in the metering chamber in order to close a pouring duct. The volume of the free body is such that the free volume remaining in the metering chamber corresponds to the amount of liquid to be metered.

13 Claims, 1 Drawing Sheet

TWO-COMPARTMENT DISPENSER WITH AN INTEGRATED SEALING DOSE REGULATOR AND A PROCESS FOR DISPENSING LIQUIDS

BACKGROUND

1. Field of the Invention

This invention relates generally to multi-compartment dispensers, and more particularly to a tubular two-compartment dispenser which is designed to fit tightly in the opening of a container.

2. Discussion of Related Art

There are numerous applications where liquids have to be dispensed in measured quantities from a container. This problem is as well-known in bars as it is in the metering of chemicals, oils or liquid active substances. A dispenser suitable for this purpose is known from European patent 0 175 256. This dispenser has the disadvantage that it can only be used in conjunction with relatively rigid containers because, in cases where this known dispenser is used, a reduced pressure is established in the container. In the case of flexible containers, this reduced pressure could lead to a certain contraction of the container which would seriously affect or disrupt the operation of the dispenser. In addition, it has been found that, depending on the liquid to be handled, the displaceability of the pouring channel for dose control in the opening formed in the cover tends to cause leakages or clogging so that the dispenser becomes unusable or the dose cannot be varied.

SUMMARY OF THE INVENTION

An object of the present invention is to provide a dispenser in which these disadvantages are eliminated, and which is inexpensive to produce and simple and reliable in operation while guaranteeing safe dose control.

According to the invention, one embodiment includes in a two-compartment dispenser a tubular body is arranged in the outer cylindrical space defined by a wall and by the base and a cover and, at one end, is tightly connected to a pouring channel and, at its other end, remains at a distance from a base, said tubular body comprising at least one opening on a peripheral line in the vicinity of the connection with the pouring channel, and in that a freely movable body of circular cross-section is provided in the main metering compartment defined by the inner cylinder between the opening and the base, its diameter being greater than that of the pouring channel, and its smallest dimension being greater than the gap between the wall and the base.

Although it has already been proposed to provide dispensers with loose bodies of circular cross-section arranged in the metering compartment, cf. for example French patent 402 258, DE-AS 1 133 650 and DE-GM 78 10 073, all these examples describe dispensers in which a ball is provided in a tubular guide which is adapted to the diameter of the ball and which is designed to perform a sealing function or to close the dispenser. In addition, the three documents are not concerned with two-compartment dispensers. In the cases of French patent 402 258 and DE-AS 1 133 650, the liquid flows directly from the container for as long as it takes the ball to move from a starting position into the closure position. This time-dependent dose control is dependent upon the geometric and physical parameters and, in particular, upon the rheological parameters of the dispenser or rather the liquid and the materials used. The liquid flows directly from the container into the pouring channel during the time it takes the ball to sink.

Accordingly, another object of the present invention is to provide a process for dispensing liquids in which dose control is more exact and which could be carried out with inexpensive but reliable dispensers.

According to the invention, another embodiment includes further developing the first embodiment to the extent that the volume of the body is selected so that the free volume remaining in the metering compartment in the case of a floating body corresponds to the volume of liquid to be dispensed or, in the case of a sinking body, is greater than the volume of liquid to be dispensed by a margin corresponding to the volume remaining in the metering compartment after the body has sunk and closed the pouring channel.

In yet another embodiment of the dispenser according to the invention, the loose body may advantageously assume the form of a sphere or cone, depending on the properties of the liquid to be handled. Both geometries ensure that the loose body does not become trapped in the gap between the wall and base of the main metering compartment making it unable to perform its function, and that the pouring channel can be tightly closed on the funnel side.

If the container with the two-compartment dispenser fitted tightly therein in accordance with EP 0 175 256 is moved into the pouring position, i.e. with the tip facing downwards, the liquid enters through the openings in the outer cylindrical casing and ascends therein until the liquid pressure is in equilibrium with the atmospheric pressure admitted through the pouring opening in the—in this position—upper part of the dispenser.

If the container is so rigid that it cannot be deformed by the atmospheric pressure, the sinking movement will stop immediately after reaching the—in this position—highest point of communication with the surrounding atmosphere because a reduced pressure now begins to build up in the container. In this case, i.e. with a sufficiently rigid container material, the dose volume is determined by the uppermost tip of the notch in the funnel. However, if the constituent material of the container is so flexible that it deforms under the atmospheric pressure, the liquid continues rising in the dispenser housing in the pouring position, so that liquid runs into the funnel in the pouring position and, hence, is additionally poured out. In other words, the dose volume cannot be controlled if the constituent material of the container is flexible.

In the dispenser according to the invention, the liquid rises in the collecting compartment when the container is in the pouring position. At the same time, the pouring channel is closed by the loose body, optionally after the previous dose has been dispensed. The container is sealed off from the atmospheric pressure. If, now, the liquid rises in the metering container to such an extent that the openings in the outer cylindrical wall are covered, there is no opportunity for pressure or product equalization between the metering compartment and the container. The air volume present above the openings in the metering compartment in this position is compressed and the liquid level rises accordingly until the pressure of the compressed air is in equilibrium with the column of liquid. The vertical interval between the openings in the outer cylinder and in the inner cylinder is gauged in such a way that the rising of the liquid, which stops when the pressure equilibrium is reached, is always stopped before the liquid is able to flow through the openings into the main metering compartment. If now the container is turned through 180°, i.e. is moved into a position in which the dispenser and the pouring opening are on top, the loose body drops down from the closure position and the liquid sinks downwards until it reaches the level of the opening in the inner cylinder—now situated underneath—throughout the lower metering compartment. In the event of further sinking, the column of liquid now standing above the opening in the inner cylinder would produce a reduced pressure within the dispenser and the container because the closure of the openings in the inner cylinder prevents any further equalization of pressure or product. The column is then brought to a standstill by the equilibrium with the atmospheric pressure.

In the practical application of the dispenser according to the invention, the dose volume is determined by pressure equalization in the closed system because the dispenser is closed to the surrounding atmosphere in the inverted position. Accordingly, the flexibility of the container has no influence so that the container may advantageously be made of a thin flexible material which also has advantages in regard to the problem of recycling.

In a preferred embodiment, the dispenser is made in three parts. The two main parts can be produced inexpensively and with considerable precision, for example as plastic injection moldings. In addition, plastic injection moldings have the advantage that, by virtue of a certain transparency, they provide a good view of the situation prevailing in the dispenser. The formation of the opening in the wall of the outer cylinder by an annular gap immediately between the cover and the outer cylinder advantageously affords the possibility of making this opening sufficiently large and locating it in a position which provides for complete emptying of the container.

The fact that the pouring channel and the inner cylinder are centrally supported by the inner surface of the outer cylinder provides for exact alignment, even in operation, particularly in the three-part version. If a bead is arranged on the inner surface of the inner cylinder, the inner part consisting of the pouring tube, the funnel and the inner cylinder may readily be fixed thereon. Whereas, where rigid materials are used, the bead has to be formed with corresponding openings, the part intended to be held in place where flexible materials are used, for example the outer upper ends of the radial supporting arms, may readily be pushed away over the bead and then held beneath it. The upper edge of the supporting arms which extends obliquely downwards readily enables a centred position to be produced and maintained when the inner cylinder is inserted.

The problem addressed by the present invention is solved both with a relatively light or relatively heavy body by comparison with the density of the liquid. However, these two alternatives have to take account of different volume parameters.

In the case of a floating body, the body arranged in the main metering compartment floats upwards on the liquid. To ensure that it does not float into a position in which it seals off the pouring channel, the openings in the inner cylinder have to be arranged at a corresponding distance towards the base. In this example, the volume of the body has to be determined in such a way that the volume present in the main metering compartment minus the immersion volume of the float corresponds to the volume of the liquid to be dispensed.

In cases where the body is heavier than the liquid, it always sinks downwards in the main metering compartment. The rate at which it sinks is determined inter alia by the weight difference and by the viscosity of the liquid. To this extent, the volume of the body has to be determined in such a way that the volume remaining in the main metering compartment after subtraction of the body's volume is greater than the volume of liquid to be dispensed by a margin which corresponds to the volume remaining in the metering compartment after the body has sunk and closed the pouring channel. In this way, the volume of liquid to be dispensed can readily be controlled by varying the volume of the body without altering the geometry of the main metering compartment both in the case of a floating body and in the case of a sinking body.

BRIEF DESCRIPTION OF THE DRAWINGS

These and other advantages will become clear from the following description of one example of embodiment illustrated in the accompanying drawings, in which like items are identified by the same reference designation, wherein.

DETAILED DESCRIPTION OF THE INVENTION

Figure 1:
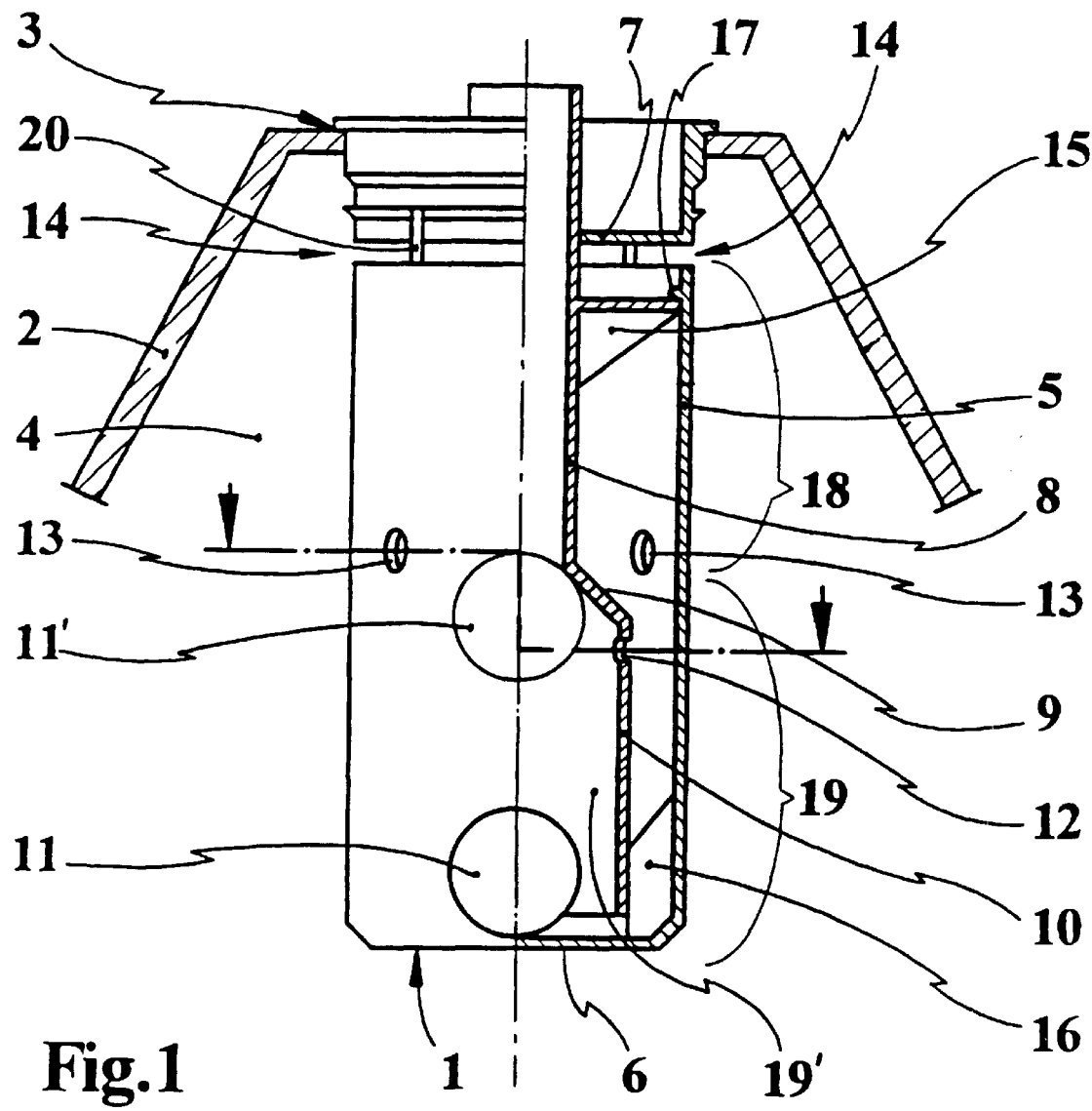
FIG. 1 is a side elevation, partly in section, of a two-compartment dispenser inserted into a container.

FIG. 1 shows how the two-compartment dispenser 1 is inserted into the opening 3 of a container 2 and seals off the opening 3. In the embodiment illustrated, the two-compartment dispenser 1 is in three parts. The outer cylindrical wall 5 and the base 6 form one part, the cover 7 with the pouring channel 8 formed therein, the adjoining funnel 9 and the cylindrical wall 10 formed thereon form the second part while a ball 11 forms the third part. The interior of the dispenser 1 is divided into two compartments by openings 13 in the outer cylinder, namely the collecting compartment 18 positioned towards the upper edge and the metering compartment 19 formed towards the base 6. Inside the metering compartment 19, a main metering compartment 19' in which a ball 11 is arranged, is defined by the inner cylinder 10 below openings 12 and the base 6.

The part consisting of the cover 7, the pouring channel 8, the funnel 9 and the inner cylinder 10 is inserted into the outer cylinder with the wall 5 and the base 6 and, through ribs 20 formed externally on the cover 7, sits on the upper edge of the outer cylindrical wall 5, maintaining an interval by which an annular gap 14 is formed between the cover 7, and the outer cylindrical wall 5. Through suitable profiling, the outer surface of the cover 7 is designed to fit sealingly into the opening 3 of a container 2. Formed integrally on the pouring channel 8 are arms 15 which extend radially outwards like a star and bear on the inner face of the wall 5. To ensure an firm fit within the outer cylinder, a bead 17 is formed on the cylindrical inner surface of the outer cylindrical wall 5 near its upper edge. The bead 17 may extend circularly over the entire circumference providing at least part is made of a flexible material so that the arms 15 arranged like a star can be pushed over the bead 17. If the dispenser 1 is made of a rigid material, openings have to be provided in the bead 17 and the inserted part has to be locked in place by rotation after passing the bead 17. Formed in the lower part of the outer cylinder are arms 16 which are directed radially inwards and which, in the inserted position, bear on the outer face of the inner cylinder 10. The upper edge of the arms 16 extends obliquely downwards and centers the inner part during its insertion.

In the illustrated embodiment, the pouring channel 8, the funnel 9 and the inner cylinder 10 are arranged centrally in relation to the cover 7 and, as a whole, within the outer cylindrical wall 5, although an eccentric arrangement is also possible.

Openings 13 are present in the outer cylindrical wall 5 at substantially the level of the funnel 9. The so-called collecting compartment 18 is formed between these openings 13 and the upper edge of the outer cylindrical wall 5. The free volume of the collecting compartment 18, i.e. the annular volume between the wall 5 and the pouring channel 8, should be greater than that part of the dispensing compartment which is situated between the base 6 and the level at which openings 12 are present in the inner cylinder 10. In addition, the distance between the openings 12 in the inserted position and the openings 13 should be sufficient to ensure that no liquid is able to overflow during the dispensing process which will be described hereinafter. Within the metering compartment 19, the base 6 and the inner cylinder 10 define a so-called main metering compartment 19' which extends to the level of the upper edge of the openings 12.

The dispensing process is described in the following. If the container 2 is turned upside down, the liquid present in the main metering compartment 19' flows out through the pouring channel 8 and the ball 11 moves into the position denoted by the reference numeral 11', closing the pouring channel 8. At the same time, the liquid present in the container 2 flows into the head of the container and through the annular gap 14 into the dispenser 1. At the same time, the liquid rises to the level of the openings 13 in the dispenser 1. As already described, the liquid stops rising after the openings 13 have been covered because the air volume present above the liquid level is closed and the air is compressed. When the air pressure is in equilibrium with the liquid pressure, the final level is reached. For the movement of the ball 11 into the position 11', in which it closes the pouring channel 8, a distinction has to be made between the cases where the ball 11 is a floating ball or a sinking ball 11. In the case of a floating ball 11, the pouring channel 8 is only closed by the ball 11 when all the liquid present in the main metering compartment 19' has been poured out. In the case of a sinking ball 11, the pouring channel 8 is closed even if a residual liquid volume is present in the main metering compartment. In this case, the volume of the ball has to be determined in dependence upon the geometry of the main metering compartment 19' and the weight difference and upon the viscosity of the liquid and the sinking rate of the ball 11 which it influences in such a way that the volume poured out before the pouring channel 8 is closed corresponds to the volume of liquid to be dispensed.

If, now, the container 2 is moved into an upright position, the ball 11 drops down and re-establishes communication with the surrounding atmosphere. At the same time, the liquid flows from the collecting compartment 18 into the metering compartment 19, the liquid level in the inner cylinder moving into an equilibrium state when the openings 12 are closed. Thereafter, there can be no further equalization of air or product between the main metering compartment 19' and the remaining metering or container space. Any further flow of liquid would produce a reduced pressure in the interior 4 of the container 2 whereas the liquid in the main metering compartment 19' is under atmospheric pressure. It can therefore be seen that the gross volume of the main metering compartment 19' is determined by the level at which the openings 12 are provided.

The effective dose volume is ultimately determined by the space occupied by the ball 11. Only that space which is not occupied by the ball 11 in the main metering compartment 19' can be filled with the liquid. It follows from this that the effective dose volume can readily be controlled by using balls 11 differing in volume, taking into account the above-described differences for floating and sinking balls 11, even though the gross volume of the main metering compartment 19' is fixed by its geometry.

If the container 2 is then returned to its inverted position and if the volume of liquid present in the main metering compartment 19' flows out through the pouring channel 8 completely in the case of a floating ball 11 and partially in the case of a sinking ball 11, the pouring channel 8 is closed by the ball 11 in its position 11' and the process described above is repeated.

Figure 2:
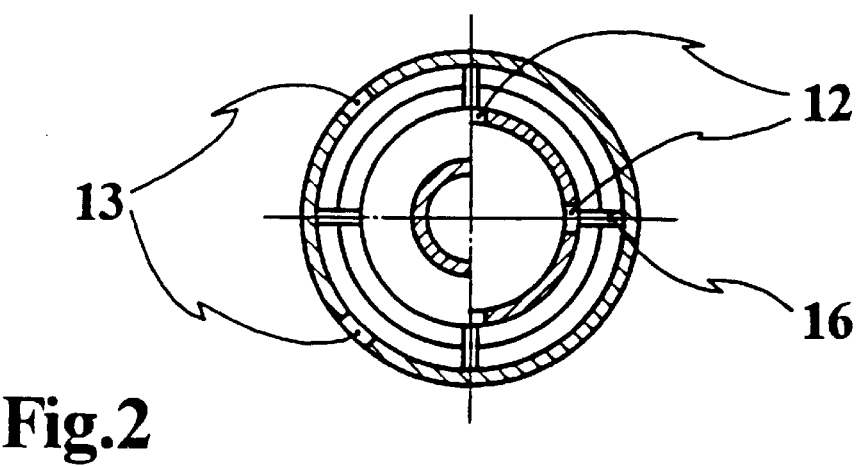
FIG. 2 is a cross-section through the two-compartment dispenser in two vertically offset sectional planes.

FIG. 2 is a cross-section through the two-compartment dispenser, showing two of four openings 13 in the outer cylinder 5 which, in the illustrated example, are offset through about 90° and of which the two openings present in the left-hand half of the cylinder are illustrated. The openings 12 in the inner cylinder 10, similarly offset through 90°, can be seen on the right-hand side of FIG. 2. The arms 16 by which the inner cylinder is centrally supported are also clearly visible.

When the container 2 is in use, the opening of the pouring channel 8 is open. When the container 2 is not in use, either the pouring opening can be separately closed by a closure which has not been shown in the drawing or the entire opening of the container 2 can be closed by a cover.

What is claimed is:

1. A tubular two-compartment dispenser for liquids is designed to fit tightly in an opening of a container, and which comprises an outer cylindrical wall with a continuous base and a cover with a pouring channel, the arrangement being such that at least a first opening is present in the wall in the vicinity of the cover, and at least a second opening is present on a peripheral line between the first opening and the base, and an inner cylindrical wall providing a tubular body is arranged in an outer cylindrical space defined by the outer cylindrical wall and by the base and the cover and, at one end, is tightly connected to the pouring channel and, at its other end, remains at a distance from the base and has at least a third opening, a freely movable body of circular cross-section being provided in said tubular body, its diameter being greater than that of the pouring channel and smaller than that of said tubular body, a portion of said tubular body being in the form of a funnel with a narrowed opening connected to said pouring channel, the funnel portion providing a valve seat for said freely movable body, wherein in the inverted position, the third opening is arranged vertically above the second opening by a distance which is greater than the rise in the liquid level in the dispenser resulting from an equilibrium between the pressure of the liquid column in the container and the pressure of the compressed air volume above the second opening in the dispenser.

2. A dispenser as claimed in claim 1, wherein said freely movable body has a least one hemispherical end.

3. A dispenser as claimed in claim 1, wherein said freely movable body has at least one conical end.

4. A dispenser as claimed in claim 1, wherein the pouring channel and the inner cylindrical wall are supported by the inner surface of the outer cylindrical wall.

5. A dispenser as claimed in claim 1 wherein said dispenser is made of a flexible material.

6. A dispenser as claimed in claim 2, wherein said dispenser is in three parts, the outer cylindrical wall and the base forming a first part, the cover, the pouring channel, the funnel and the inner cylindrical wall forming a second part, and the loose body forming a third part, the first part being designed to fit coaxially in the second part.

7. A dispenser as claimed in claim 6, further including spacers formed underneath the cover and, in the inserted position, bear against the upper edge of the outer cylindrical wall so that an annular gap is formed between the cover and the outer cylindrical wall.

8. A dispenser as claimed in claim 6, further including an annular bead formed on the inner surface of the outer cylindrical wall near its upper edge, and radially extending arms arranged on the pouring channel for centrally supporting the pouring channel and in that the outer upper ends of the radial arms are locked in place beneath the annular bead.

9. A dispenser as claimed in claim 6, further including for centrally supporting the inner cylindrical wall, a plurality of arms directed radially inward provided on the inner surface of the outer cylindrical wall, the arms being arranged near the base, and each arm having an upper edge extending obliquely downwards.

10. A dispenser as claimed in claim 1, wherein the density of the body is lower than that of the liquid to be dispensed.

11. A dispenser as claimed in claim 10, further including a main metering compartment between said inner and outer cylindrical walls proximate said base, wherein the body has such an immersion volume that the free volume remaining in said main metering compartment after subtraction of the immersion volume is equal to the volume of liquid to be dispensed.

12. A dispenser as claimed in claim 1, wherein the density of the body is greater than that of the liquid to be dispensed.

13. A dispenser as claimed in claim 12, wherein the body has such a volume that the free volume remaining in the main metering compartment after the volume of the body has been subtracted is greater than the volume of liquid to be dispensed.

* * * * *